UNITED STATES PATENT OFFICE.

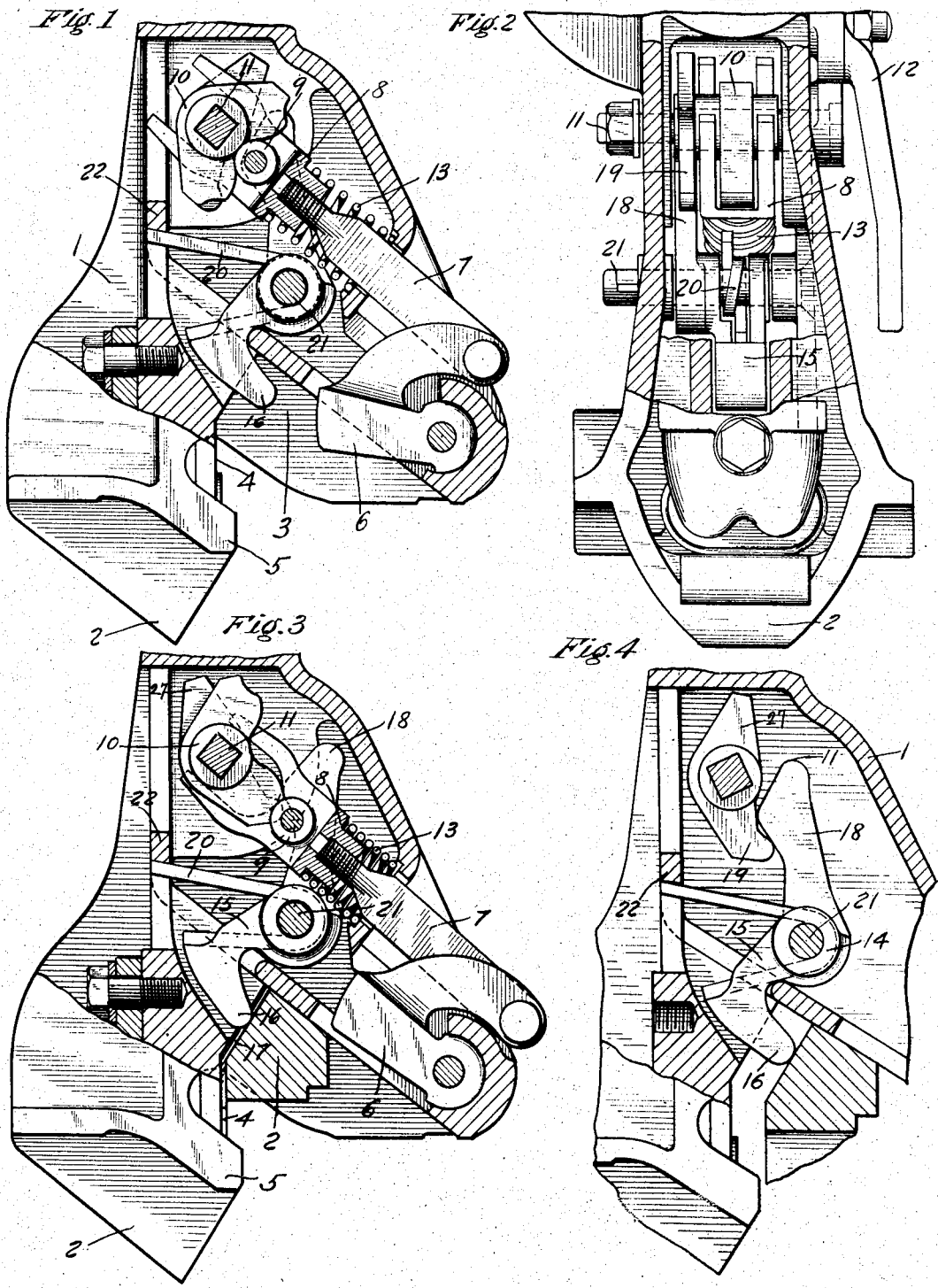

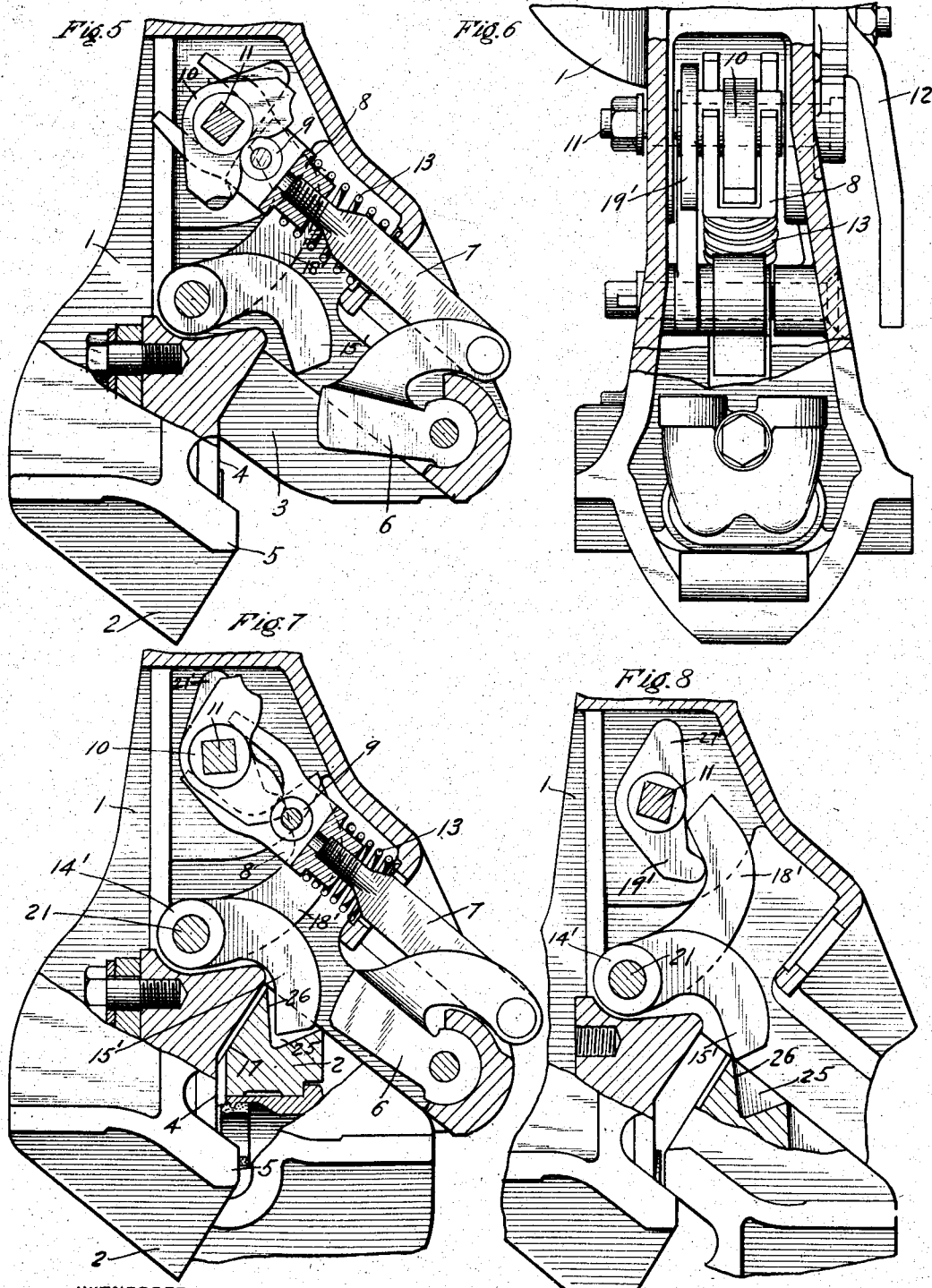

HARRY F. WOERNLEY, OF PITTSBURGH, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

AUTOMATIC CAR AND PIPE COUPLING.

1,108,300.  Specification of Letters Patent.  Patented Aug. 25, 1914.

Application filed January 15, 1912. Serial No. 671,254.

*To all whom it may concern:*

Be it known that I, HARRY F. WOERNLEY, a citizen of the United States, residing at Pittsburgh, in the county of Allegheny and State of Pennsylvania, have invented new and useful Improvements in Automatic Car and Pipe Couplings, of which the following is a specification.

This invention relates to automatic car coupling devices, and more particularly to that type in which the draw-bar coupling mechanism is combined with means for coupling the air brake pipe, or other fluid pressure conduits.

In certain classes of car couplings, the coupler heads are locked together by means of locking devices and in order to uncouple, a hand operated mechanism is provided for shifting the locking device to its unlocked position, so that when cars are separated, the adjacent coupler heads are free to uncouple. After the cars are separated, or before again coupling up, the uncoupling lever should be operated to shift the locking device to its normal locking or coupling position, otherwise the coupling head will not be locked with the counterpart head when the cars are again coupled. It sometimes happens that the operator fails to do this and as a consequence the coupler heads may not be properly locked together in the coupled position.

The principal object of my invention is to provide means for tripping the locking device when the coupler heads are uncoupled, so that the locking device will be automatically returned to the normal locking position without attention on the part of the operator.

In the accompanying drawings, Figure 1 is a horizontal sectional view of a car coupling device embodying one form of my improvement; Fig. 2 a vertical sectional view of same; Fig. 3 a horizontal sectional view similar to Fig. 1 showing the parts in the coupled position but ready to uncouple; Fig. 4 a horizontal sectional view of the same coupler head, taken on a plane to more clearly show the automatic tripping device;
Fig. 5 a horizontal sectional view of a car coupling device embodying another form of my improvement; Fig. 6 a vertical sectional view of same; Fig. 7 a horizontal sectional view similar to Fig. 5, showing the parts in the uncoupled position but ready to uncouple; and Fig. 8 a horizontal sectional view of the same coupler head, taken on a plane to more clearly show the automatic tripping device.

As shown in the drawings, the coupler head is formed of a casting 1 having a projecting portion 2 and a recess 3 for engaging corresponding parts of a counterpart coupler head on an adjacent car. Centrally arranged, transversely of the coupler, is a vertical and longitudinal plane surface 4 through which one or more openings are made for fluid pressure connections. Above and below this plane surface are formed transverse projections or hooked portions 5 having inclined surfaces adapted to engage and interlock with corresponding portions of a counterpart coupler head, each head being provided with a pivoted latch or locking lever 6 having a cam surface for engaging a corresponding curved surface on the projecting portion 2 of the counterpart coupler head, and a spring 13 acting through the medium of a rod 7, pivoted to said lever 6, to force the lever into its locking position. As thus far described, the structure corresponds substantially with that covered in prior Patent No. 708,747 of September 9, 1902. Secured to the rod 7 is a forked crosshead 8 having a central recess containing a pivoted roller 9.

Adjacent to the roller 9 is a double cam 10 mounted on the squared portion of an operating shaft 11 having bearings in the casting 1. A handle 12 outside of the casting 1 is operatively connected to said shaft 11. The double cam 10 consists of two diverging projecting portions and an intermediate recess, as shown in Fig. 1. When the roller 9 rests in the recess, the spring 13 acts on the rod 7 to shift the locking lever 6 to its locking position and when the handle 12 is operated in either direction, the roller 9 is forced outwardly by engagement with the surface of the corresponding projecting portion of the double cam 10 and the locking lever 6 thereby shifted to its unlocked position, as shown in Fig. 3.

According to my present improvement, a tripping device is provided, comprising a pivotally mounted rocker arm 14 having a projecting member 15 provided with a toe 16 adapted to engage with the inclined surface 17 of the projecting portion 2 and an arm 18 adapted to engage either with a lever 19 or lever 27 carried by the shaft 11 and preferably cast integral with the double cam device 10. The member 15 has a centrally arranged recess for a spring 20 which is coiled around the pivot pin 21 of the rocker arm 14 and has one end in engagement with the toe 16 and the other end in engagement with a projection or stop 22 on the casting 1. The pressure of the spring 20 tends to rotate the rocker arm 14 so as to engage either with the lever 19 or the lever 27 and turn the same with the shaft 11 to the normal locking position.

In operation, when two coupler heads are brought together, the inclined face 17 of the projection 2 of one coupler head engages the toe 16 of arm 14 on the counterpart head and in the movement to the coupled position, forces the rocker arm 14 to the position shown in Fig. 3, against the resistance of spring 20. In order to uncouple, the operating lever 12 is turned so that the roller 9 is forced outwardly by one of the projecting portions and thereby the rod 7 shifts the lever 6 to its uncoupling position, as shown in Fig. 3. The coupler heads are now free to separate when the cars are pulled apart and as the inclined face 17 of the projection 2 moves away, the toe 16 can move outwardly and the rocker arm 14 is thereupon rotated by the spring 20 to turn the lever 19 and thereby the shaft 11. The rotation of cam 10 throws the roller 9 out of its locking engagement with said cam and the spring 13 acting on the rod 7 is then permitted to complete the full movement of the locking device to its normal locking position, in readiness for again coupling up. It will now be evident that with my improvement it is not necessary for the operator to set the operating levers of the coupler heads back to the locking position, as this operation is automatically accomplished as above described.

According to the form of my improvement illustrated in Figs. 5 to 8 of the drawings, the spring 20 may be dispensed with and the tripping device positively operated by the direct action of the coupler heads separating. As well understood, with this type of coupler, the projections 5 perform the same function as the knuckles of the ordinary car coupler, and in the act of uncoupling after the locking levers are released, as the cars separate, the projection 5 on each head moves laterally on the coacting inclined face of the projection 5 of the counterpart coupler head. This lateral movement of the coupler head is employed, in the form of my improvement now to be described, for operating the tripping device. Accordingly, the projecting portion 2 of the coupler head is provided with a centrally arranged notch or recess 25, within which the end of lever 15' carried by the rocker arm 14' is adapted to rest when the coupler heads are locked together. The other lever 18' of the rocker arm 14' is adapted to engage either with an arm 19' similar to arm 19 of the construction hereinbefore described or with arm 27'.

In operation, the handle 12 having been operated to shift the locking device 6 to the uncoupling position, as shown in Fig. 7, when the cars are separated, the projections 5 of the coupler heads move laterally as well as longitudinally and the end of the lever 15', engaging the longitudinal face 26 of the recess 25, is shifted and thereby the lever 18' acts on the arm 19' to shift the same toward the normal locking position, as shown in Fig. 8. The arm 19' having been thus partially rotated, the full movement of the locking device to the normal locking position is effected by the spring 13, as in the previously described construction. It will be understood that in case the handle is turned in the opposite direction so that the other projection of the cam 10 engages the roller 9 instead of the one shown in Figs. 3 and 7, then the movement of the rocker arm operates to rotate the shaft 11 through either the lever 27 or lever 27' according to which construction is employed. In the construction shown in Figs. 5 to 8 inclusive where the spring 20 is dispensed with, the rocker arm 14' is shifted into position in the recess 25 by the engagement either of lever 19' or lever 27' with the end of lever 18' in the act of turning the locking device to the unlocking position, as will be evident.

Having now described my invention, what I claim as new and desire to secure by Letters Patent, is:—

1. An automatic car coupling comprising a member having a laterally projecting hooked portion adapted to engage a similar portion of a counterpart coupling, a locking lever for clamping said members together laterally, a spring tending to move said lever to the locking position, a cam for shifting said locking lever to and holding same in its unlocked position to permit uncoupling, and a rocker arm in engagement with said cam and adapted to move upon withdrawal of the counterpart coupling from the coupled position and thereby trip said cam out of the unlocked position to permit said spring to shift the locking lever to the locking position.

2. An automatic car coupling comprising a member having a laterally projecting hooked portion adapted to engage a similar portion of a counterpart coupling and provided with an inclined face adapted to engage a similar face on the counterpart coupling to thereby cause a lateral and longitudinal movement of the coupling members in the act of uncoupling, a locking device for clamping the members together laterally, a cam for shifting the locking device to and holding the same in its unlocked position to permit uncoupling, and a rocker arm for tripping said cam from its unlocked position to permit the locking device to return to the locking position, said rocker arm being operated by the lateral movement of the counterpart coupling in the act of uncoupling.

In testimony whereof I have hereunto set my hand.

HARRY F. WOERNLEY.

Witnesses:
A. M. CLEMENTS,
CLYDE V. McCURDY.

Copies of this patent may be obtained for five cents each, by addressing the "Commissioner of Patents, Washington, D. C."